US012276536B2

(12) United States Patent
Malinovskiy et al.

(10) Patent No.: US 12,276,536 B2
(45) Date of Patent: Apr. 15, 2025

(54) METHOD FOR FILLING-LEVEL MEASUREMENT

(71) Applicant: Endress+Hauser SE+Co. KG, Maulburg (DE)

(72) Inventors: Alexey Malinovskiy, Maulburg (DE); Simon Greth, Lörrach (DE); Carmen Roser, Steinen (DE); Lukas Klute, Weil am Rhein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 593 days.

(21) Appl. No.: 17/282,845

(22) PCT Filed: Sep. 5, 2019

(86) PCT No.: PCT/EP2019/073730
§ 371 (c)(1),
(2) Date: Apr. 5, 2021

(87) PCT Pub. No.: WO2020/069813
PCT Pub. Date: Apr. 9, 2020

(65) Prior Publication Data
US 2021/0348961 A1    Nov. 11, 2021

(30) Foreign Application Priority Data
Oct. 5, 2018   (DE) ............... 10 2018 124 606.4

(51) Int. Cl.
*G01F 23/284*       (2006.01)
(52) U.S. Cl.
CPC ............... *G01F 23/284* (2013.01)

(58) Field of Classification Search
None
See application file for complete search history.

(56) References Cited

U.S. PATENT DOCUMENTS 6,078,280 A     6/2000  Perdue et al.
2007/0107801 A1*  5/2007  Cochran .............. B67C 3/007
                                                141/153

(Continued)

FOREIGN PATENT DOCUMENTS

DE    10360710 A1    10/2005
EP     2166318 A1     3/2010
EP     2372388 A1    10/2011

*Primary Examiner* — Whitney Moore
(74) *Attorney, Agent, or Firm* — Mark A. Logan; Endress+Hauser (USA) Holding, Inc.

(57) ABSTRACT

Disclosed is a method for the radar-based measurement of a filling level, in which method a difference curve is adjusted iteratively in successive measurement cycles to suppress interfering echoes. The iterative adjustment is accomplished by: calculating a difference curve from the evaluation curve and a predefined reference curve; determining the filling level from the evaluation curve within a selection region; checking if the difference curve satisfies a predefined criterion at at least one location; redefining the selection region at said location in the subsequent measurement cycle when the difference curve satisfies the criterion; and set the evaluation curve as a new reference curve when the difference curve satisfies the criterion. The iterative adjustment provides the advantage that the search region of the filling level maximum in the evaluation curve is limited on one side, and slowly changing interfering echoes can also be detected.

8 Claims, 3 Drawing Sheets

(56) References Cited

U.S. PATENT DOCUMENTS

| | | | |
|---|---|---|---|
| 2009/0235736 A1* | 9/2009 | Spanke | G01F 23/284 |
| | | | 73/290 V |
| 2012/0174664 A1 | 7/2012 | Welle et al. | |
| 2015/0192449 A1* | 7/2015 | Malinovskiy | G01F 23/296 |
| | | | 342/124 |
| 2020/0209046 A1* | 7/2020 | Müller | G01F 25/20 |
| 2021/0326593 A1* | 10/2021 | Bonsignore | G06T 7/586 |

* cited by examiner

METHOD FOR FILLING-LEVEL MEASUREMENT

CROSS-REFERENCE TO RELATED APPLICATIONS

The present application is related to and claims the priority benefit of German Patent Application No. 10 2018 124 606.4, filed on Oct. 5, 2018 and International Patent Application No. PCT/EP2019/073730, filed on Sep. 5, 2019, the entire contents of which are incorporated herein by reference.

TECHNICAL FIELD

The invention relates to a method for measuring the filling level of a filler located in a container and to a filling-level measuring device for carrying out this method.

BACKGROUND

In process automation technology, field devices for capturing or modifying process variables are generally used. For this purpose, the functioning of the field devices is in each case based on suitable measuring principles in order to capture the corresponding process variables, such as filling level, flow rate, pressure, temperature, pH value, redox potential, or conductivity. A wide variety of such field devices is manufactured and distributed by the Endress+Hauser company.

For measuring the filling level of fillers in containers, radar-based measuring methods have become established since they are robust and require minimum maintenance. Within the scope of the invention, the term container also refers to containers that are not closed, such as basins, lakes, or flowing bodies of water. A key advantage of radar-based measuring methods lies in their ability to measure the filling level quasi-continuously. In the context of this patent application, the term radar refers to signals or electromagnetic waves having frequencies between 0.03 GHz and 300 GHz. Typical frequency bands in which filling-level measurement is carried out are 2 GHz, 6 GHz, 26 GHz, or 79 GHz.

In the case of radar-based filling-level measurement, the pulse time-of-flight principle is an established measuring principle. Here, pulse-shaped microwave signals are emitted cyclically in the direction of the filler and the time of flight until reception of the corresponding pulse-shaped receive signal is measured. On the basis of this measuring principle, filling-level measuring devices can be realized with comparatively low circuitry complexity. A radar-based filling-level measuring device which operates according to the pulse time-of-flight method is described, for example, in the unexamined patent application DE 10 2012 104 858 A1.

If a more complex circuit technology can be accepted, FMCW (frequency-modulated continuous wave) is a possible measuring principle for radar-based filling-level measurement. For a typical construction of FMCW-based filling-level measuring devices, reference is made by way of example to the unexamined patent application DE 10 2013 108 490 A1.

The measuring principle in FMCW radar-based distance measuring methods is based on emitting the microwave signal continuously but with a modulated frequency. In this case, the frequency of the microwave signal lies within a defined frequency band in the region of a standardized center frequency. Characteristic of FMCW is here that the transmission frequency is not constant but changes periodically within the defined frequency band. At a center frequency of 79 GHz, the frequency band is, for example, 2 GHz, that is, from 78 GHz to 80 GHz. With FMCW as well, the emission or reception of the microwave signals is divided into successive measurement cycles.

The change in frequency over time is linear by default for FMCW and has a sawtooth or triangular shape. However, a sinusoidal change can in principle also be used. In contrast to the pulse time-of-flight method, the distance or the filling level when implementing the FMCW method is determined on the basis of the instantaneous frequency difference between the current receive signal and the just emitted microwave signal.

With both of the aforementioned measuring principles, a corresponding evaluation curve is recorded on the basis of the receive signal in order to ascertain the filling level. In the case of the pulse radar-based method, due to the high pulse frequency, the evaluation curve is generated by undersampling the reflected receive signal. As a result, the evaluation curve represents the actual reflected receive signal in a time-expanded way. When implementing the FMCW method, the evaluation curve is generated by mixing the just transmitted microwave signal with the reflected receive signal. Here as well, the evaluation curve is expanded in its time axis through the mixing. Regardless of the measuring principle, the evaluation curve reflects the amplitude of the reflected receive signal as a function of the measuring distance.

The filling level is determined from the evaluation curve by detection and local assignment of the corresponding local maximum. In the ideal case, there is no further maximum besides the maximum that is generated by the filler surface. Due to other reflecting surfaces in the container interior, however, further maxima appear at corresponding locations on the evaluation curve in addition to the filling-level maximum in the evaluation curve. However, only the maximum that is generated by the filler surface is relevant to filling-level measurement. Therefore, further information in the evaluation curve is filtered out in practice in order to make the filling-level measurement more reliable. The filtering can be effected in various ways.

On the one hand, the evaluation curve can be smoothed by means of a suitable filtering method, such as mean value, maximum value, or low-pass filtering, in order to subsequently be able to determine the filling level on the basis of the smoothed evaluation curve. In doing so, low smoothing offers the advantage that the maxima can be better resolved locally. This allows the filling level to be determined more precisely. This is limited by a stronger smoothing. However, a stronger smoothing reduces the susceptibility to errors or failures of the filling-level measurement.

On the other hand, if the container is empty or under calibration conditions, such as the absorption of the transmitted signal as complete as possible, a reference curve can be generated. In doing so, the current evaluation curve is compared with the stored reference curve by means of difference formation. The maximum corresponding to the filler surface is subsequently determined on the basis of the resulting difference curve. Above all, static interfering echoes, such as the "ringing" of the filling-level measuring device in the antenna region, or static internals in the container are suppressed. However, non-static interfering echoes, such as, for example, due to rotating agitators or gradual build-up of deposits in the container, are not detected thereby. Therefore, above all after prolonged operation, there is the risk of a false filling level value being ascertained by the filling-level measuring device as a result of such interfering echoes.

SUMMARY

Therefore, the object of the invention is to provide a filling-level measuring device by means of which the filling level can be determined more reliably.

The invention achieves this object by a method for radar-based measurement of a filling level of a filler which is present within a measurement region in a container. In this case, an initial selection region is defined within the measurement region and is preferably initially defined over the entire measurement region. Based thereon, the method comprises the following method steps, which are repeated in successive measurement cycles:

emitting a microwave signal in the direction of the filler,
receiving a receive signal after reflection of the microwave signal inside the container,
generating an evaluation curve on the basis of at least the receive signal,
forming a difference curve on the basis of the evaluation curve and a predefined reference curve,
determining the filling level on the basis of the evaluation curve or on the basis of the difference curve within the selection region,
checking whether the difference curve satisfies a predefined criterion at at least one location,
redefining the selection region for the subsequent measurement cycle at the location at which the criterion is satisfied if the difference curve satisfies the predefined criterion at the at least one location, and
defining the evaluation curve as a new reference curve for the subsequent measurement cycle if the difference curve satisfies the predefined criterion at the at least one location.

The method according to the invention offers the advantage that the search region of the filling-level maximum in the evaluation curve, on the one hand, can be limited. Nevertheless, above all, non-static interfering echoes, which change only slowly, can be detected so that the filling-level measurement becomes more reliable as a result.

Since the criterion is checked with regard to the difference curve, that is to say with regard to a discrete number of value pairs or a mathematical function, the term criterion is to be understood in the mathematical sense. Accordingly, as a criterion within the scope of the invention, for example, the exceeding of a predefined amplitude or of a specific value, of a slope or of a discontinuity in the difference curve can be used as the criterion for which the difference curve is checked.

The first-time definition of the reference curve is not prescribed in a fixed manner according to the invention; it can be made dependent on the specific field of application: For example, for the first-time formation of the difference curve, an evaluation curve generated when the container is empty, during a first-time filling-level measurement in the container, or in a calibration environment can be implemented as the initial reference curve.

In a development of the method according to the invention, the reference curve and/or the difference curve or the fulfilled criterion and the associated location and in a history profile can be stored if the evaluation curve is defined as a new reference curve for the subsequent measurement cycle. That is, whenever the criterion is newly satisfied within the evaluation curve, the current reference curve or difference curve, which will be replaced in the next measurement cycle, is stored. Thus, for diagnostic purposes, for example, there can be a tracking of whether and where the criterion was fulfilled. This makes it possible to derive whether and when an echo loss occurred, for example, or how quickly the filling level changed, for example.

Based thereon, the method according to the invention can be expanded once again by analyzing the history profile with an image processing method, especially, with the convolutional network based on deep learning, in such a way that any previously known change patterns of the criterion are recognized. The respective typical change pattern can in turn be assigned to the corresponding cause, such as a filling or emptying process, a stirring operation, the boiling of the filler or condensate formation. If appropriate, if the respective pattern is recognized, the filling level value can also be verified and/or corrected so that the selection region can optionally be correspondingly offset.

Analogously to the method according to the invention according to one of the aforementioned embodiments, the object on which the invention is based is achieved by a corresponding radar-based filling-level measuring device. For this purpose, the filling-level measuring device comprises the following components:

a signal generating unit designed to respectively emit a microwave signal in the direction of the filler in successive measurement cycles,
a receiving unit designed to receive the corresponding receive signal after reflection of the microwave signal inside the container, and
an evaluation unit designed to
generate an evaluation curve per measurement cycle on the basis of at least the receive signal,
determine the filling level on the basis of the evaluation curve in the selection region,
form a difference curve by subtracting the evaluation curve and a predefined reference curve,
check whether the difference curve satisfies the predefined criterion at at least one location,
redefine the selection region for the subsequent measurement cycle at the location at which the criterion is satisfied if the difference curve satisfies the predefined criterion at the at least one location, and
define the evaluation curve for the subsequent measurement cycle as a new reference curve if the difference curve satisfies the predefined criterion at the at least one location.

Preferably, the filling-level measuring device can be designed in such a way that the location or extension of the selection region can be manually configured by a plant operator if necessary. This may be necessary, for example, if the filling level value is expected in a known region after a loss of the filling level echo. In principle, if the selection region is not initially defined over the entire measurement region, the extension of the selection region can be measured, for example, with 2% to 20% of the entire measurement region, in order to limit the search region for the filling-level maximum in the evaluation curve accordingly.

With reference to the filling-level measuring device, the term unit within the framework of the invention is understood in principle to mean any electronic circuit which is suitably designed for the respective intended purpose. Depending on the requirement, it can therefore be an analog circuit for generating or processing corresponding analog signals. However, it can also be a (semiconductor-based) digital circuit, such as an FPGA, or a storage medium in interaction with a program. In this case, the program is designed to carry out the corresponding method steps or to apply the necessary calculation operations of the respective unit. In this context, various electronic units of the filling-level measuring device in the sense of the invention can potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 3:
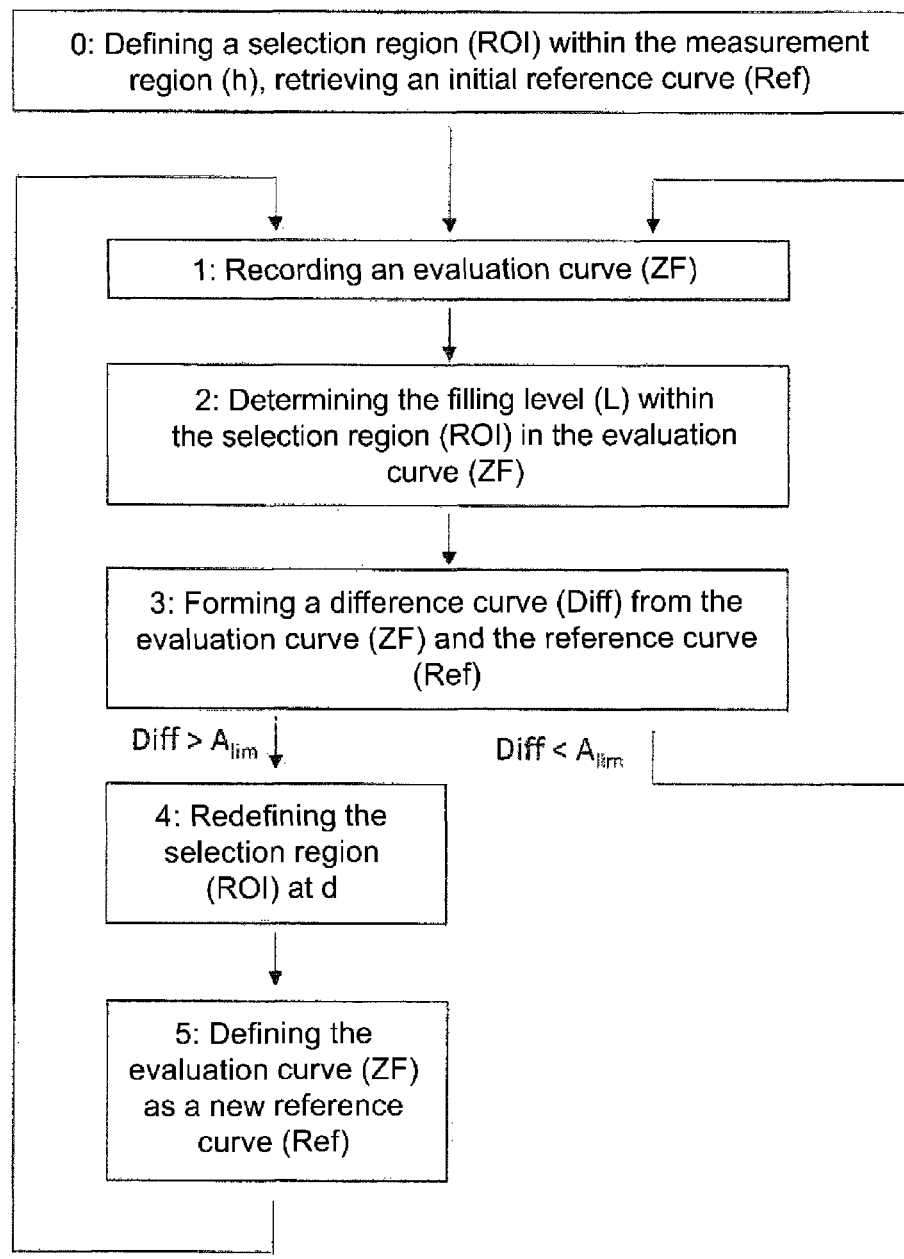
FIG. 3 shows a block diagram of the process sequence according to the present disclosure.

FIG. 3: a block diagram of the process sequence according to the invention.

Figure 1:
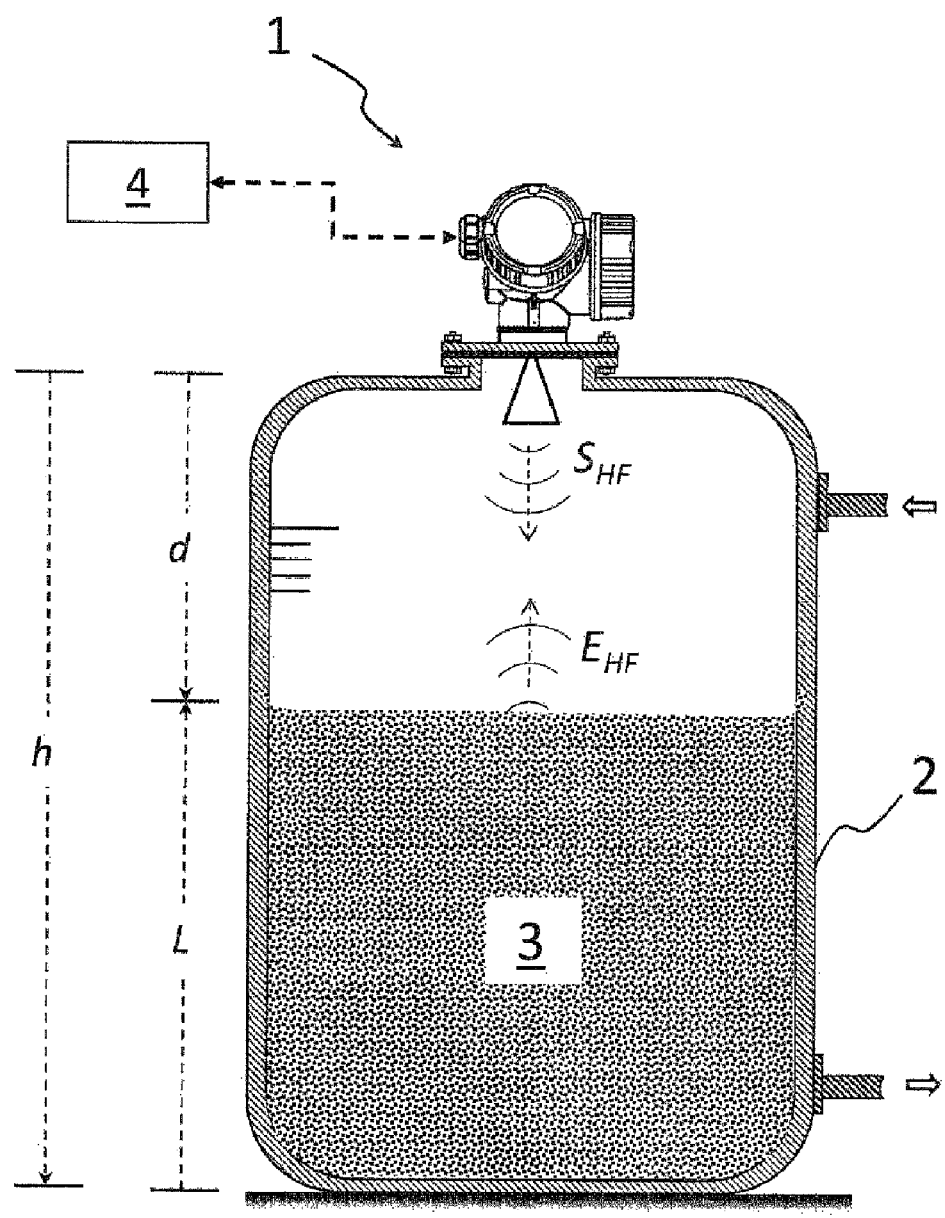
FIG. 1 shows a typical arrangement of a radar-based filling-level measuring device.

For a basic understanding of the invention, FIG. 1 shows a typical arrangement of a freely radiating radar-based filling-level measuring device 1 on a container 2. In the container 2 is a filler 3, whose filling level L is to be determined by the filling-level measuring device 1. For this purpose, the filling-level measuring device 1 is mounted on the container 2 above the maximum permissible filling level L. Depending on the field of application, the installation height h of the filling-level measuring device 1 above the container bottom can be more than 100 m.

As a rule, the filling-level measuring device 1 is connected via a bus system, such as "Ethernet," "PROFIBUS," "HART," or "Wireless HART," to a higher-level unit 4, such as a process control system or a decentralized database. On the one hand, information about the operating status of the filling-level measuring device 1 can thus be communicated. On the other hand, information about the filling level L can also be transmitted via the bus system in order to control any inflows or outflows that may be present at the container 2.

Since the filling-level measuring device 1 shown in FIG. 1 is designed as freely radiating radar, it comprises a corresponding antenna. As indicated, the antenna can be designed as a horn antenna, for example. Especially in the case of radar frequencies above 100 GHz, the antenna can also be realized as a planar antenna. Regardless of the design, the antenna is oriented in such a way that corresponding microwave signals $S_{HF}$ are emitted in the direction of the filler 3. In doing so, the microwave signals $S_{HF}$ are generated depending on the measuring method (pulse time-of-flight or FMCW) in a corresponding signal generating unit of the filling-level measuring device 1.

The microwave signals $S_{HF}$ are reflected at the surface of the filler 3 and, after a corresponding signal propagation time, are received as receive signals $E_{HF}$ by the antenna or a downstream receiving unit of the filling-level measuring device 1. The filling level L can be determined from the receive signals $E_{HF}$ because the signal propagation time of the microwave signals $S_{HF}$, $E_{HF}$ depends on the distance $d=h-L$ of the filling-level measuring device 1 to the filler surface.

In order to determine the filling level L on the basis of the receive signal $E_{HF}$, an evaluation unit of the filling-level measuring device 1 designed for this purpose generates an evaluation curve ZF on the basis of the receive signal $E_{HF}$. In this case, the evaluation curve ZF reproduces the amplitude A of the reflected receive signal as a function of the measuring distance d or the signal propagation time of the transmitted signal $S_{HF}$/receive signal $E_{HF}$.

When implementing the FMCW method, the evaluation unit of the filling-level measuring device 1 generates the evaluation curve ZF in principle by mixing the just received receive signal $E_{HF}$ with the currently emitted microwave signal $S_{HF}$, wherein the microwave signal $S_{HF}$ is transmitted continuously for this purpose with a sawtooth-shaped frequency change.

In the case of the pulse time-of-flight method, the evaluation curve ZF is generated by undersampling the pulse-shaped receive signal $E_{HF}$, wherein the pulse frequency of the sampling signal for this purpose differs by less than one per mill from the pulse frequency of the microwave signal $S_{HF}$ or of the receive signal $E_{HF}$.

Figure 2:
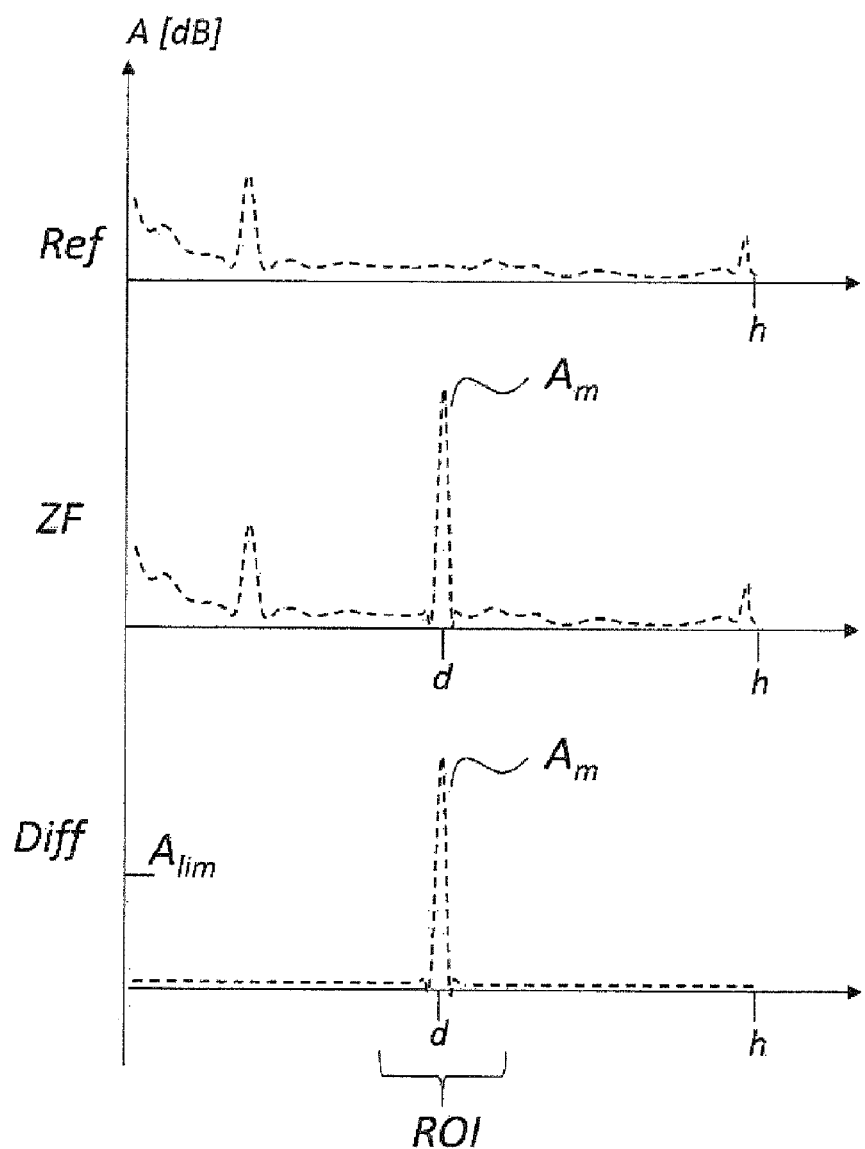
FIG. 2 shows schematic representations of an evaluation curve, a reference curve, and a difference curve.

In the case of both FMCW and the pulse time-of-flight method, the evaluation curve ZF reproduces the signal amplitude A of the receive signal $E_{HF}$ as a function of the measuring distance h. In the case of freely radiating, radar-based filling-level measurement, the corresponding measurement region h accordingly extends from the antenna of the filling-level measuring device 1 to the container bottom 2. A schematic evaluation curve ZF is shown in FIG. 2.

From the evaluation curve ZF, the evaluation unit of the filling-level measuring device 1 determines the filling level L. For this purpose, the location d of the maximum $A_m$ of the filler surface is ascertained. For searching the maximum $A_m$, any suitable algorithm can be implemented in the evaluation unit.

Especially when non-static interfering echoes occur, which arise, for example, as a result of gradual build-up of deposits in the container 2, corresponding further maxima can however also appear in addition to the filling-level maximum $A_m$ in the evaluation curve ZF, which maxima are not recognizable by means of conventional filtering. Consequently, this can lead to the determination of an incorrect filling level value L if an interfering echo is incorrectly interpreted by the filling-level measuring device 1 as a filling level echo $A_m$.

The method according to the invention, with which such interfering echoes can also be suppressed, is therefore illustrated in more detail with reference to FIG. 2 and FIG. 3: The method is based on limiting the search region of the filling level echo in the evaluation curve to a selection region ROI within the measurement region h in order to exclude specific interfering echoes and to reduce the computing effort for the evaluation unit. For this purpose, the extension of the selection region ROI is, for example, only between 2% and 20% of the measurement region h.

According to the invention, at least the position of the selection region ROI within the measurement region h is shifted by the location d of the maximum $A_m$ in the preceding measurement cycle n if this is not one of the first measurement cycles n in which the criterion has not yet been satisfied, and if the maximum $A_m$ was detected in the preceding measurement cycle n.

So that the filling-level maximum $A_m$ can also be found in the first measurement cycle n=1, the selection region ROI at the beginning of the first measurement cycle n=1 can be defined on the one hand over the entire measurement region h. On the other hand, for the first measurement cycle n=1 or if the filling-level maximum $A_m$ could not be found in the previous measurement cycle n, the selection region ROI can be set manually to a predetermined location of the measurement region h. For example, if it is known that the container 2 is initially empty and subsequently fills, the selection region ROI can be correspondingly placed at the end of the measurement region h.

In order to determine the location d of the maximum $A_m$ for a possible repositioning of the selection region ROI in the next measurement cycle n, the evaluation unit of the filling-level measuring device 1 forms a difference curve Diff through difference formation on the basis of the specific evaluation curve ZF determined in the current measurement cycle n and a defined reference curve Ref. In this respect, difference formation means subtraction of the two curves Diff, Reff or of the corresponding data points from each other.

In the first measurement cycle or for the first-time formation of the difference curve Diff, an evaluation curve ZF which was recorded with empty container 2 can be used as reference curve Ref. Such a reference curve Ref without a corresponding filling-level maximum $A_m$ is shown in FIG. 2. The peripheral maxima there can be caused by the container bottom or by interfering bodies. The increased amplitude at the beginning of the measurement region h can be caused by so-called "ringing" of the antenna.

Alternatively, an evaluation curve ZF which is based on a first-time filling-level measurement in the container 2 or on a measurement in a calibration environment can also be used as reference curve Ref for the first-time formation of the difference curve Diff. A calibration environment can be given, for example, by a measurement space in which the microwave signal $S_{HF}$ is completely absorbed.

In order to find the location d of the maximum $A_m$, the evaluation unit checks the difference curve Diff within the selection region ROI according to the invention for a predefined criterion. In this respect, the criterion can be defined in various ways, e.g., as an exceeding of a predefined minimum amplitude $A_{lim}$ as schematically shown in FIG. 2. Alternatively, however, a minimum slope of the difference curve Diff or a minimum area under the difference curve Diff can also be implemented as a criterion to be checked. If the criterion is satisfied in the current measurement cycle n at a specific location d in the difference curve, for example because the minimum amplitude $A_{lim}$, is exceeded there, the selection region ROI is positioned for the subsequent measurement cycle at this location d. In addition, the current evaluation curve ZF is defined as the new reference curve Ref for the subsequent measurement cycle n.

However, if the criterion is not satisfied in the current measurement cycle n in the underlying difference curve Diff, the selection region ROI is left at this location d in the subsequent measurement cycle n. In such a case, the reference curve Ref is also not modified for the subsequent measurement cycle.

Through the possible adaptation of the evaluation curve ZF as a new reference curve Ref, creeping changes with regard to possible interfering echoes in the difference curve Diff are also taken into account. At the same time, the computing effort for searching the filling-level maximum $A_m$ is kept low since the selection region ROI for searching the filling-level maximum $A_m$ is shifted as well. As a whole, the reliability of the filling-level measurement is thus potentially increased by the method according to the invention.

The invention claimed is:

1. A method for a radar-based measurement of a filling level of a filler which is present within a measurement region in a container, the method comprising:
    defining a selection region within the measurement region;
    emitting a microwave signal in a direction of the filler;
    receiving a receive signal after reflection of the microwave signal inside the container;
    generating an evaluation curve on the basis of at least the receive signal, wherein the evaluation curve reproduces an amplitude of the reflected receive signal as a function of a measuring distance within the measurement region;
    forming a difference curve by subtracting the evaluation curve and a predefined reference curve;
    searching for a filling level echo only within the selection region on the evaluation curve and determining the filling level based on a distance of the filling level echo;
    checking whether the difference curve satisfies a predefined criterion at at least one location within the selection region on the difference curve, wherein the predefined criterion is an exceeding of a predefined minimum amplitude, a minimum slope, or a minimum area under or in the difference curve;
    redefining the selection region for a subsequent measurement cycle at the at least one location at which the predefined criterion is satisfied when the difference curve satisfies the predefined criterion at the at least one location, wherein the redefining of the selection region includes positioning the selection region to the at least one location at which the predefined criterion is satisfied and sizing the selection region to between 2% and 20% of the measurement region; and
    setting the evaluation curve as a new reference curve for the subsequent measurement cycle when the difference curve satisfies the predefined criterion at the at least one location.

2. The method according to claim 1, wherein the selection region is defined as entire measurement region.

3. The method according to claim 1, wherein for a first-time formation of the difference curve, an evaluation curve generated when the container is empty, during a first-time filling-level measurement in the container, or in a calibration environment is used as the reference curve.

4. The method according to claim 1, further comprising:
    storing in a history profile the reference curve and/or the difference curve or the at least one location and the associated fulfilled criterion when the evaluation curve is set as a new reference curve for the subsequent measurement cycle.

5. The method according to claim 4, further comprising:
    analyzing the history profile with an image processing method to recognize any previously known change patterns of the criterion.

6. The method according to claim 5, wherein the image processing method includes a convolution network based on deep learning.

7. A radar-based filling-level measuring device, comprising:
    a signal generating unit designed to emit a microwave signal in a direction of a filler inside a container in successive measurement cycles;
    a receiving unit designed to receive a corresponding receive signal after reflection of the microwave signal inside the container; and
    an evaluation unit designed to:
        define a measurement region and a selection region within the measurement region;
        generate an evaluation curve per measurement cycle on the basis of at least the receive signal, wherein the evaluation curve reproduces an amplitude of the reflected receive signal as a function of a measuring distance within the measurement region;

search for a filling level echo only within the selection region on the evaluation curve and determine the filling level based on a distance of the filling level echo;

form a difference curve by subtracting the evaluation curve and a predefined reference curve;

check whether the difference curve satisfies a predefined criterion at at least one location within the selection region on the difference curve, wherein the predefined criterion is an exceeding of a predefined minimum amplitude, a minimum slope, or a minimum area under or in the difference curve;

redefine the selection region for a subsequent measurement cycle at the at least one location at which the predefined criterion is satisfied when the difference curve satisfies the predefined criterion at the at least one location, wherein the redefining of the selection region includes positioning the selection region to the at least one location at which the predefined criterion is satisfied and sizing the selection region to between 2% and 20% of the measurement region; and set the evaluation curve for the subsequent measurement cycle as a new reference curve when the difference curve satisfies the predefined criterion at the at least one location.

8. The filling-level measuring device according to claim 7, wherein the location or the extension of the selection region is manually configurable.

* * * * *